(12) United States Patent
Perkins et al.

(10) Patent No.: US 7,918,091 B1
(45) Date of Patent: **\*Apr. 5, 2011**

(54) SYSTEMS AND METHODS FOR CONTROLLING HUMIDITY

(75) Inventors: David E Perkins, Austin, TX (US);
Joseph F Pinkerton, Austin, TX (US)

(73) Assignee: Active Power, Inc., Austin, TX (US)

( * ) Notice: Subject to any disclaimer, the term of this patent is extended or adjusted under 35 U.S.C. 154(b) by 1230 days.

This patent is subject to a terminal disclaimer.

(21) Appl. No.: 11/524,758

(22) Filed: Sep. 20, 2006

(51) Int. Cl.
*F01K 13/00* (2006.01)
(52) U.S. Cl. ............................... 60/646; 60/657; 60/659
(58) Field of Classification Search .................... 60/646, 60/657, 659
See application file for complete search history.

(56) References Cited

U.S. PATENT DOCUMENTS

| | | | |
|---|---|---|---|
| 2,979,916 A * | 4/1961 | Mason | 62/172 |
| 3,222,883 A * | 12/1965 | Glaspie | 62/172 |
| 3,965,675 A * | 6/1976 | Martz et al. | 60/39.182 |
| 4,100,745 A | 7/1978 | Gyarmathy et al. | |
| 4,110,987 A | 9/1978 | Cahn et al. | |
| 4,147,204 A | 4/1979 | Pfenninger | |
| 4,150,547 A | 4/1979 | Hobson | |
| 4,158,145 A | 6/1979 | Kartsounes et al. | |
| 4,237,692 A | 12/1980 | Ahrens et al. | |
| 4,281,256 A | 7/1981 | Ahrens et al. | |
| 4,291,836 A * | 9/1981 | Chen-Hsiung | 239/37 |
| 4,593,202 A | 6/1986 | Dickinson | |
| 4,765,142 A | 8/1988 | Nakhamkin | |
| 4,872,307 A | 10/1989 | Nakhamkin | |
| 4,936,098 A | 6/1990 | Nakhamkin | |
| 5,379,589 A | 1/1995 | Cohn et al. | |
| 5,491,969 A | 2/1996 | Cohn et al. | |
| 5,537,822 A | 7/1996 | Shnaid et al. | |
| 5,602,462 A | 2/1997 | Stich et al. | |
| 5,771,693 A * | 6/1998 | Coney | 60/407 |
| 5,845,479 A | 12/1998 | Nakhamkin et al. | |
| 5,889,659 A | 3/1999 | Emmerich | |
| 5,934,063 A | 8/1999 | Nakhamkin | |
| 6,108,206 A | 8/2000 | Criniti et al. | |
| 6,192,687 B1 | 2/2001 | Pinkerton et al. | |

(Continued)

FOREIGN PATENT DOCUMENTS

EP 0 563 553 2/1993

(Continued)

OTHER PUBLICATIONS

Foy, R.J., "Self Contained Power Supply on the Radio-Based ECP Braking System," GE Transportation Systems: Global Signaling, Sep. 2001.

*Primary Examiner* — Hoang M Nguyen
(74) *Attorney, Agent, or Firm* — Hulsey, P.C.; William N. Hulsey, III; Loren T. Smith

(57) ABSTRACT

Systems and methods for controlling humidity of a working fluid used to provided climate control of a mission critical application are provided. Such control may be accomplished by using a humidification system in connection with a CAS or TACAS system. The humidification system may introduce a liquid (e.g., water) into one or more, predetermined points within the CAS or TACAS system to adjust the moisture content of a working fluid used to influence the environment of a mission critical application or enclosure.

7 Claims, 9 Drawing Sheets

U.S. PATENT DOCUMENTS

| | | |
|---|---|---|
| 6,255,743 B1 | 7/2001 | Pinkerton et al. |
| 6,321,539 B1 | 11/2001 | Bronicki et al. |
| 6,463,738 B1 | 10/2002 | Pinkerton et al. |
| 6,494,042 B2 | 12/2002 | Bronicki |
| 6,691,552 B2 * | 2/2004 | Cardelius ................ 73/23.2 |
| 6,883,328 B2 | 4/2005 | Bronicki |
| 7,127,895 B2 * | 10/2006 | Pinkerton et al. ............ 60/646 |
| 7,230,344 B2 | 6/2007 | Pollack et al. |
| 7,681,395 B2 * | 3/2010 | Pinkerton et al. ............ 60/646 |
| 2001/0000091 A1 | 4/2001 | Nakhamkin et al. |

FOREIGN PATENT DOCUMENTS

| | | |
|---|---|---|
| FR | 2 807 884 | 10/2001 |
| WO | WO 96/19942 | 1/1996 |
| WO | WO 99/15319 | 4/1999 |
| WO | WO 02/44555 A1 | 6/2002 |
| WO | WO 2004/053295 A1 | 6/2004 |
| WO | WO 2005/006516 A1 | 1/2005 |

* cited by examiner

SYSTEMS AND METHODS FOR CONTROLLING HUMIDITY

BACKGROUND OF THE INVENTION

The present disclosure relates to systems and methods for controlling humidity, and more particularly to controlling humidity of a working fluid provided by compressed air storage systems to mission critical applications.

Mission-critical applications such as data centers, server rooms, and other facilities housing sensitive electronics generally require reliable backup energy and cooling systems. Such applications may require a continuous and uninterrupted supply of power during periods of normal operation (e.g., the period of operation in which primary or utility power is available) and backup operation (e.g., the period of operation in which primary or utility power is interrupted, even if such interruption lasts a fraction of a second). In addition, such applications may require cooling during both normal and backup modes of operation to, for example, ensure optimal operating efficiency and/or to prevent equipment damage (e.g., by overheating).

During the normal mode of operation, primary or utility power may power a cooling system for cooling the mission critical application. However, during an interruption of primary power, one or more backup systems are needed to provide power and/or cooling for the mission critical system. Several systems are known for supplying uninterruptible power and cooling. For example, compressed air storage (CAS) systems and thermal and compressed air storage (TACAS) systems may provide backup power, including uninterrupted backup power when outfitted with transient power supplies, and cooling to mission critical applications.

CAS and TACAS systems utilize energy stored in compressed gas (or sometimes referred to as a working fluid) to generate power. Power is generated when the compressed gas drives a turbine, which in turn drives an electrical machine (e.g., a generator), which may produce the power. Examples of CAS and TACAS systems for generating power may be found in U.S. patent application No. 2004/0148922, the disclosure of which is hereby incorporated by reference herein in its entirety.

CAS and TACAS systems may take advantage of Joule-Thompson expansion of gas to obtain cooling in the form of cold gas by expanding the compressed gas. The compressed gas may be expanded at one or more points in the system, thereby enabling the system to route cold gas as desired. For example, the cold gas can be used to provide cooling for mission critical applications or for cooling various components or subsystems of the CAS and TACAS systems.

In addition to Joule-Thompson expansion gas, an adiabatic expansion (or nearly adiabatic expansion) of gas may occur as the compressed gas expands across the turbine. The expanded gas being discharged from the turbine may be used to cool a mission critical application.

While backup energy systems are available to provide backup power and/or cooling, it is desirable to provide greater control over the climate in which the mission critical application resides. For example, it may be desirable to precisely control the humidity in addition to the temperature of an enclosure housing a mission critical application. Maintaining the enclosure within an optimal range of humidity may be necessary to avoid damage to electronic equipment. For example, an above-optimal level of humidity may corrode circuitry or result in short circuits, which can result in malfunctions and equipment failures. A below-optimal level of humidity may promote an environment of enhanced static electricity, which may interfere with equipment operation and potentially lead to static discharges that can render electronic circuitry inoperable.

Approaches for ensuring dry gas is transmitted from a source of compressed air to the turbine in CAS and TACAS systems are known. For example, when gas is compressed and stored, it may pass through one or more driers or desiccant to remove moisture from the compressed gas. The removal of moisture may be necessary to prevent freezing of valves (e.g., regulators, flow-control valves, and solenoid valves) and wear of components in the flow stream caused by liquid droplets or ice particles flowing through the system. Though such approaches are effective for protecting against improper operation and component damage, such approaches may result in gas that is too dry for use in mission critical applications.

Accordingly, in view of the foregoing, it is desirable to provide systems and methods for controlling humidity of a working fluid used to provide climate control of a mission critical application.

SUMMARY OF THE INVENTION

Systems and methods for controlling humidity of a working fluid used to provided climate control of a mission critical application are provided. Such control may be accomplished by using a humidification system in connection with a CAS or TACAS system. The humidification system may introduce a liquid (e.g., water) into one or more predetermined points within the CAS or TACAS system to adjust the moisture content of a working fluid used to influence the environment of a mission critical application or enclosure.

In one embodiment, a humidification system may be constructed to introduce a liquid into a pressurized working fluid path. A pressurized working fluid path of a CAS or TACAS system may include the portion of the system where the pressure of the working fluid is greater (e.g., substantially greater) than atmospheric pressure. For example, a pressurized working fluid path may exist between a source of compressed gas and the turbine, as the turbine may expand the compressed gas to or near atmospheric pressure. Since the working fluid path is pressurized, the humidification system may be constructed to provide a high to low pressure drop to enable liquid to be introduced into the pressurized working fluid path. This high to low pressure drop may be provided by pressurizing a reservoir (which contains the liquid) to a pressure at least slightly higher than the pressure of the working fluid in the portion of the pressurized working fluid path receiving the liquid. Several different approaches may be implemented to provide the high to low pressure drop and to control the quantity of liquid introduced into the working fluid path.

In another embodiment, a humidification system may be constructed to introduce a liquid to a low pressure working fluid path. A low pressure working fluid path may contain working fluid having a relatively low pressure (at least compared to the pressure of the working fluid in a pressurized working fluid path), which pressure may be near to or at atmospheric pressure. For example, a low pressure working fluid path may include a conduit connecting the turbine outlet to an enclosure or to a room enclosing a mission critical application such as a continuous power consuming load. Since the pressure of the working fluid in the low pressure working fluid path is relatively low, a reservoir containing the liquid may not require pressurization to provide a high to low pressure drop necessary for introducing liquid into the low pressure working fluid path. Thus, the interior of the reservoir may be exposed to the ambient environment such that interior reservoir pressure is at or near atmospheric pressure (or the substantially the same as the pressure of the working fluid being exhausted by the turbine). A venturi or other pressure reducing device may be mounted within the low pressure working fluid path to cause a pressure drop in the working fluid, thereby enabling liquid to be introduced into the low pressure working fluid path.

BRIEF DESCRIPTION OF THE DRAWINGS

The above and other features of the present invention, its nature and various advantages will be more apparent upon consideration of the following detailed description, taken in conjunction with the accompanying drawings, in which like reference characters refer to like parts throughout, and in which.

DETAILED DESCRIPTION OF THE INVENTION

Figure 1:
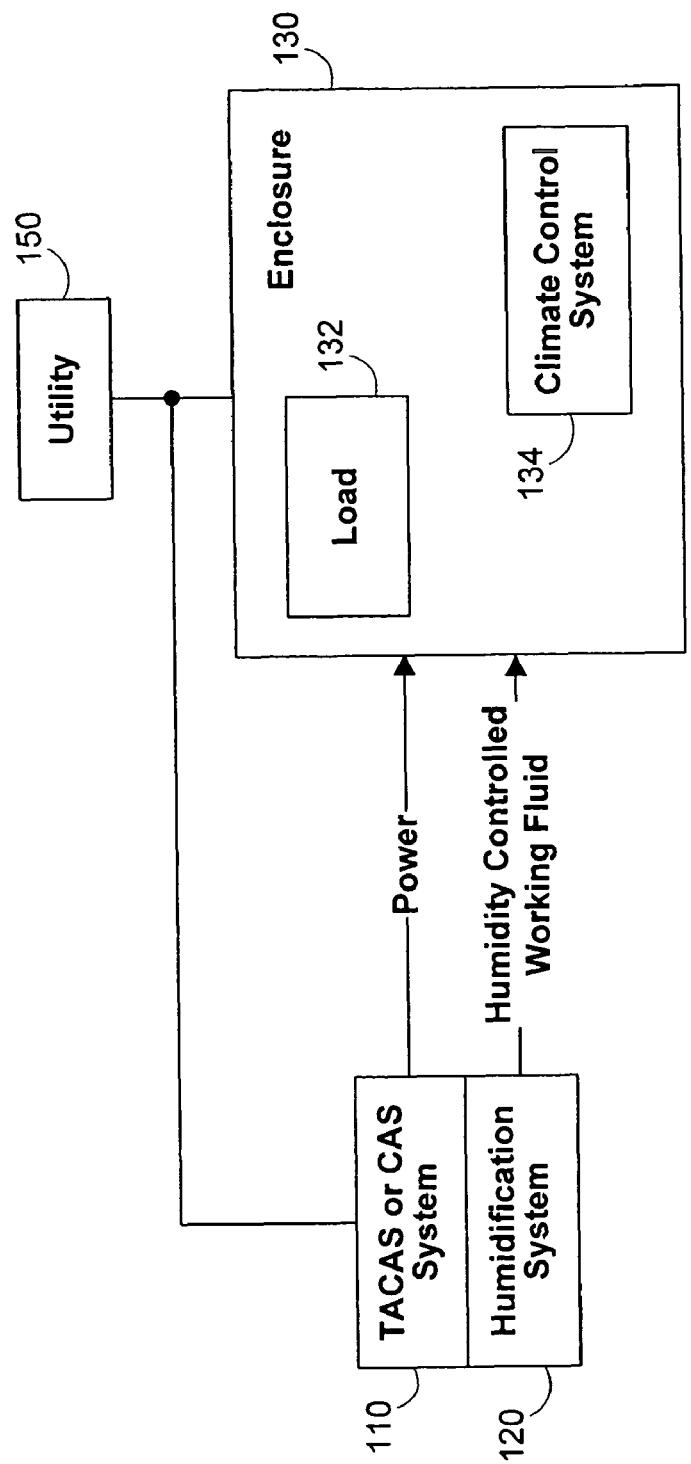
FIG. 1 shows an illustrative block diagram of a critical load system using a humidification system in accordance with the principles of the present invention.

FIG. 1 shows an illustrative block diagram of a critical load system 100 using a humidification system in accordance with the principles of the present invention. System 100 includes CAS or TACAS system 110 that can generate power for load 132 and a humidification system 120 according to the invention. As will be explained in greater detail below, humidification system 120 may inject moisture or liquid into a working fluid path to adjust the moisture content or humidity of the working fluid provided to enclosure 130. A working fluid path may be a path or combination of paths in which a fluid (e.g., gas) flows from a gas source to a gas destination. For example, the gas source may be a pressurized tank containing compressed gas and the gas destination may be enclosure 130.

Enclosure 130 may be any suitable structure for housing a load 132 (e.g., a critical load or mission critical application). Enclosure 130 may be a room, a hut, an underground facility, or other suitable facility. If desired, enclosure 130 may be a structure amenable to provide a controlled environment. Enclosure 130 may be fitted with a climate control system 134 to provide localized control over the environment (e.g., temperature and humidity level) of enclosure 130.

During a normal mode of operation, load 132 may be supplied with power from utility power source 150. In addition, climate control system 134 may draw power from utility power source 150 to control the environment of enclosure 130 during normal operation. When utility power source 150 is interrupted, at which point, system 100 may enter into a backup mode of operation, systems 110 and 120 provide uninterrupted, backup power to load 132 and a working fluid to enclosure 130. The working fluid may supplant, or in another approach, assist the operation of the climate control system 134 in controlling the environment of enclosure 132. The working fluid may supplant operation of climate control system 134 if it is rendered inoperable during the utility power source interruption. In situations where the systems 110 and 120 have sufficient capacity to power climate control system 134 such that it is able to achieve at least a portion of its maximum environmental control potential, the working fluid may assist climate control system 134 in controlling the enclosure environment.

Humidification system 120 may be coupled to CAS or TACAS system 110 and operative to inject moisture or a liquid into the working fluid at one or more predetermined points in the working fluid path. Examples of such predetermined points are discussed below in more detail in connection with FIG. 2. The injected moisture or liquid may be carried to enclosure 130 in the working fluid where it (the moisture) humidifies the enclosure environment. Humidification system 120 may control the humidity of the environment within enclosure 130 by controlling the quantity of moisture or liquid introduced into the working fluid path. Examples of ways to control the introduction of a liquid into a working fluid path are discussed below in connection with the text corresponding to FIGS. 3-7.

Figure 2:
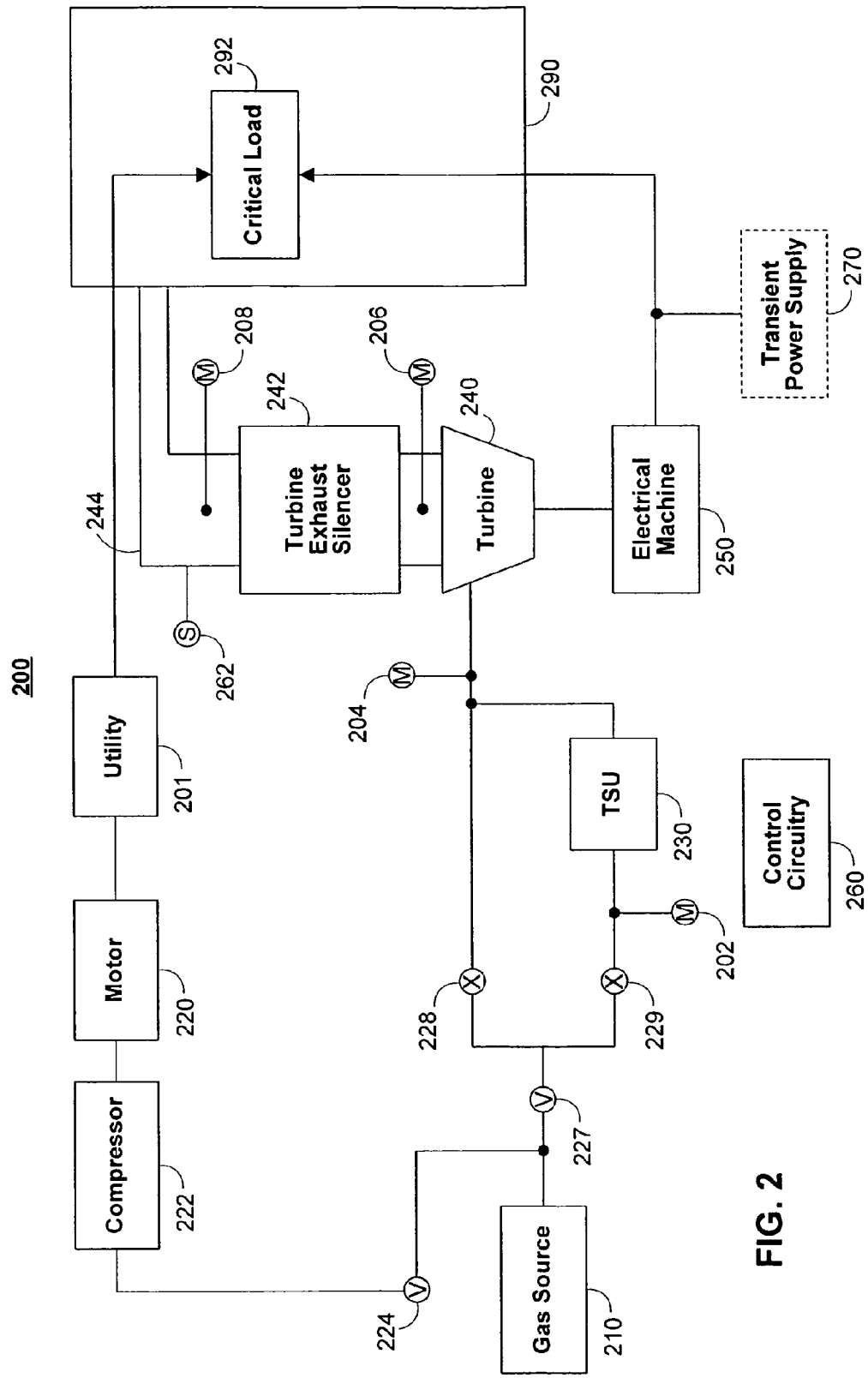
FIG. 2 shows a simplified schematic diagram of a critical load system using a humidification system in accordance with the principles of the present invention.

FIG. 2 shows a simplified schematic diagram of a critical power system 200 using a humidification system in accordance with the principles of the present invention. Backup energy system 200 may include moisture entry points 202, 204, 206, and 208, utility 201, motor 220, compressor 222, one way valve 224, gas source 210, shutoff valve 227, main valve 228 and bypass valve 229, thermal storage unit 230, turbine 240, optional turbine exhaust silencer 242, optional conduit 244, electrical machine 250, power conversion circuitry (not shown), control circuitry 260, and sensor 262. If desired, optional transient power supply 270 (e.g., flywheel energy storage system, ultracapacitor, batteries, etc.) may also be provided. It is understood that turbine 240 and electrical machine 250 may function together as an integrated turbine-generator, but are shown independent of each other.

The working fluid path may begin at gas source 210 and end at enclosure 290, and may include valves 227-229, thermal storage unit 230, turbine 240, turbine exhaust silencer 242, and conduit 244. A pressurized portion of the working fluid path may exist between gas source 210 and turbine 240. A low pressure portion of the working fluid path may exist between turbine 240 and enclosure 290. Moisture entry points may be provided at points along the working fluid path. Each moisture entry point represents a location in the working fluid path where a humidification system may introduce a liquid or moisture to the working fluid.

As shown, moisture entry point 202 exists between valve 229 and thermal storage unit 230. Moisture entry point 204 may exist between valve 228 and turbine 240, and preferably downstream of where thermal storage unit 230 reconnects with the path existing between valve 228 and turbine 240. Note that positions of moisture entry points 202 and 204 minimize potential adverse effects caused by ice particles, which may form if the temperature of the working fluid is cold enough. Assuming, for example, the temperature of the working gas is cold enough freeze the liquid introduced at moisture entry point 202, thermal storage unit 230 heats the working fluid, thereby melting any potentially formed ice particles. In addition, because of thermal storage unit 230, the temperature of the working fluid at moisture entry point 204 may be sufficiently warm enough to prevent freezing of the liquid. Moisture entry point 206 may exist between turbine 240 and turbine exhaust silencer 242. Moisture entry point 206 may exist at some point between the outlet of turbine exhaust silencer 242 and enclosure 290, or anywhere within conduit 244. Persons skilled in the art will appreciate that moisture entry points may exist at other locations not specifically mentioned herein.

Utility 201 may supply power to critical load 292. Persons skilled in the art will appreciate that utility 201 may be any type of primary power source, AC or DC. Utility 201 may also power motor 220, which drives compressor 222 to charge gas source 210 with compressed gas. The compressed gas may be pushed through one way valve 224 to prevent leakage or backflow. Persons skilled in the art will appreciate that gas source 210 can be any suitable gas storage apparatus such as one or more pressure tanks, a cavern, or an underground salt dome.

Valve 228 may regulate the pressure and/or flow of gas provided from gas source 210 substantially directly to turbine 240, bypassing thermal storage unit 230. Valve 229 may regulate the pressure and/or flow of the gas provided from gas source 210 to thermal storage unit 230, which heats the gas before it is recombined with the gas from valve 228 being provided to turbine 240. This combined gas then drives turbine 240, which in turn drives electrical machine 250 to produce electrical power. The electrical power may be provided to power conversion circuitry (not shown) which conditions the power before providing it to critical load 292. The turbine exhaust gas may be exhausted to turbine exhaust silencer 242 prior to entering conduit 244, which may direct turbine exhaust gas to enclosure 290.

Thermal storage unit 230 may be an exhaustless heater (e.g., a non-polluting heater). Examples of and discussion of the operation of such thermal storage units can be found, for example, in U.S. patent application publication Nos. 2005/0126172 and 2005/0279292, both of which are hereby incorporated by reference herein in their entireties.

The particular valve and gas routing configuration shown in FIG. 2 is merely illustrative. If desired, a single gas routing path may be used for routing gas to a turbine, in which case, the path including valve 228 may be omitted. A dual gas path routing system may be preferable to single gas flow path for exercising a greater degree of control over the inlet temperature and pressure of the gas being supplied to turbine 240. Examples of such dual path routing systems are described in more detail in U.S. patent application publication Nos. 2006/0076426 and 2006/0060246, which are hereby incorporated by reference herein in their entireties.

Although control circuitry 260 is not shown to be connected to any of the components included in critical power system 200, persons skilled in the art will appreciate that control circuitry 260 can perform control and monitoring functions well known and understood in the art. For example, control circuitry 260 can cause valve 227 to OPEN when utility power is interrupted (e.g., fails). Control circuitry 260 may control components of humidification system (not shown) to control the quantity of liquid introduced into the working fluid path. In addition, control circuitry 260 may receive signals from sensor 260, which may indicate a humidity level of the working fluid in conduit 244. Control circuitry 260 may instruct the humidification system to start introduction of liquid, add more or less liquid, or cease introduction of liquid altogether, depending on the monitored humidity level.

Typically, utility 201 may supply power to motor 222, critical load 292 and any other power consuming devices associated with enclosure 290 (e.g., an air conditioning system) when system 200 is operating in a normal mode of operation. In addition, utility 201 may provide power to transient power supply 270. When utility 201 is interrupted, system 200 may operate in a backup mode of operation. In the backup mode of operation, energy is derived from the decompression of the pressurized gas stored in gas source 210 and converted into electrical power which is provided to critical load 292. Thermal storage unit 230 may add energy to the working fluid in the working fluid path to further enhance the operating efficiency of turbine 240, which in turn may translate into more efficient power generation by electrical machine 250. Also, during the backup mode of operation, the working fluid may receive liquid at one or more moisture entry points 202, 204, 206, and 208 prior to being routed to enclosure 290 to provide climate control of the enclosure environment.

The foregoing discussion of backup energy system 200 is not intended to be a thorough discussion of TACAS systems, but is intended to provide a general framework of a system in which the present invention may be implemented. For a more detailed explanation of TACAS backup power supply systems, as briefly described above, and variations thereof, see U.S. patent application publication No. 2004/0148934, which is hereby incorporated by reference herein in its entirety. The present invention can be incorporated in other emergency critical power delivery systems such as those described in U.S. patent application publication No. 2004/0148922, which is hereby incorporated by reference in its entirety.

Figure 3:
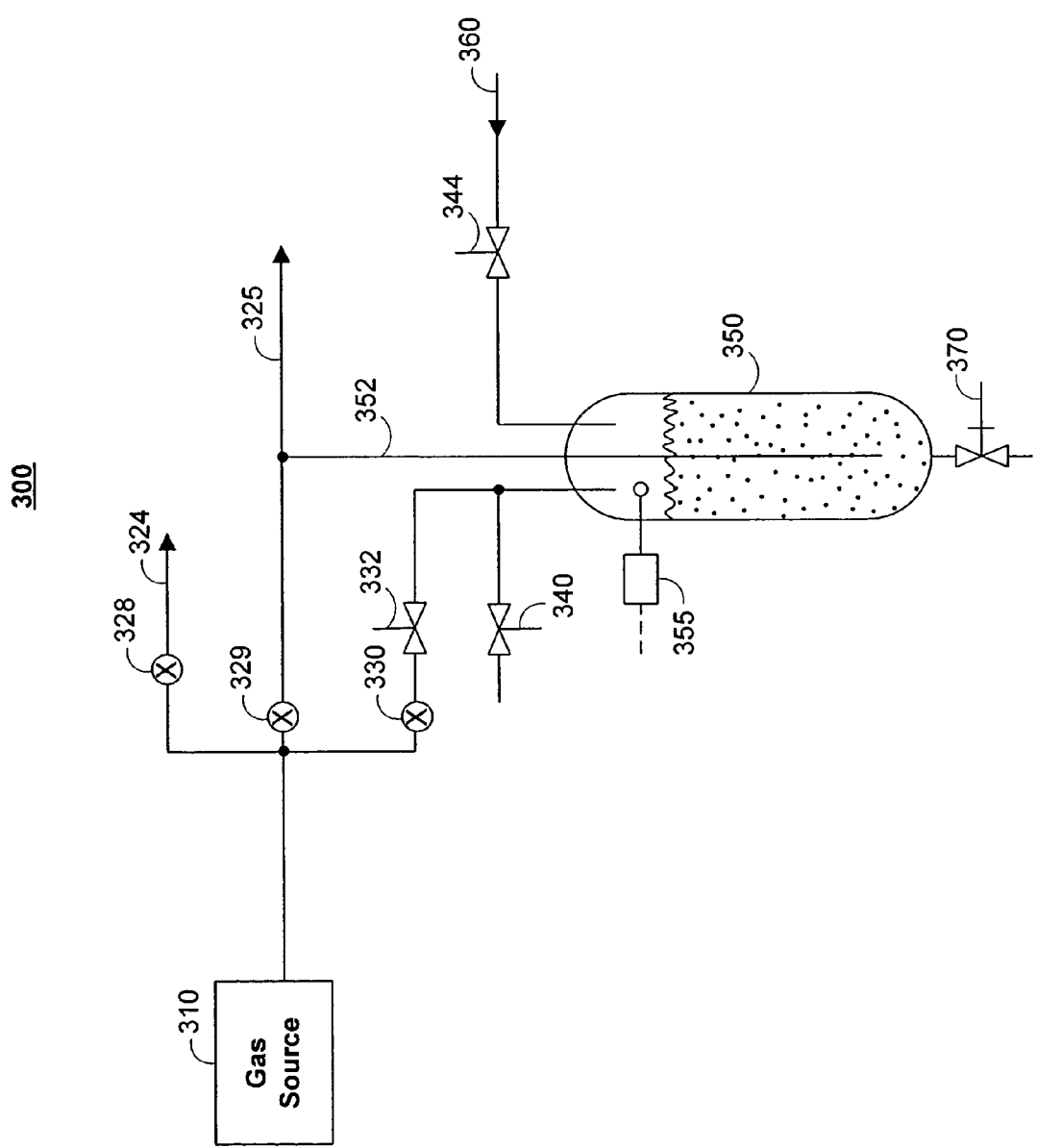
FIG. 3 is a schematic diagram of a humidification system for introducing liquid into a pressurized working fluid path in accordance with the principles of the present invention.

FIG. 3 is a schematic diagram of a humidification system 300 for introducing liquid into a pressurized working fluid path in accordance with the principles of the present invention. Humidification system 300 may be suited for introducing liquid at, for example, one or both of moisture entry points 202 and 204 (of FIG. 2). Humidification system 300 is shown to introduce liquid at moisture entry point 202 of FIG. 2, and only a portion of system 200 is reproduced to avoid overcrowding the figure. Persons skilled in the art will appreciate that humidification system 300 (as well as humidification systems 400, 500, 600, and 700) are not limited to being used in connection with a backup energy and cooling system such as the one shown in and described in connection with FIG. 2.

Gas source 310 may be included for providing a working fluid (e.g., compressed gas) and valves 328 and 329 may be provided for regulating the pressure of the working fluid in pressurized working fluid paths 324 and 325, respectively. For example, gas source 310 may be equivalent to gas source 210 of FIG. 2 and valves 328 and 329 may be equivalent to valves 228 and 229, respectively, of FIG. 2. It should be noted that, for convenience and clarity, similar components of different embodiments are similarly numbered. For example, the gas source of FIG. 2 is numbered "210" (where 3XX generally refers to components identified in FIG. 2), while the gas source of FIG. 3 is numbered "310."

Working fluid path 325 may be coupled to receive liquid or moisture from liquid reservoir 350 via conduit 352. In order for liquid or moisture to enter working fluid path 325, liquid reservoir 350 may have to be pressurized at least slightly higher than the pressure of the working fluid in working fluid path 325. This may be accomplished by setting the pressure setpoint of valve 330 higher than the highest pressure setpoint of valve 328, valve 329, or both, to ensure that the pressure in liquid reservoir 350 and conduit 352 is higher than the pressure in working fluid path 325. When flow control valve 332 is OPEN, pressure of the compressed gas pushes down on the liquid in reservoir 350, forcing it into and up through conduit 352 to the moisture insertion point.

As shown, liquid reservoir 350 may be coupled to receive working fluid from flow control valve 332.

Flow control valve 332 may control the flow of compressed gas into reservoir 350, which control may influence the degree to which liquid is injected into working fluid path 325. Flow control valve 332 may be adjusted to fully CLOSE, fully OPEN, or to a position between fully CLOSED and fully OPEN. Flow control valve 332 may be controlled by control circuitry (not shown). If desired, flow control valve 332 may be replaced with a valve that provides a fixed flow of gas for a given pressure.

As also shown, conduit 352 is fluidically coupled to a predetermined point in working fluid path 325 and constructed to extend to a predetermined position near the bottom of reservoir 350 (so as to avoid drawing up any sediment that may have settled on the bottom and injecting that sediment into working path 325). Reservoir 350 may be connected to valve 340, valve 344, and drain 370. Valves 340 and 344 may be solenoid valves which may OPEN and CLOSE under the direction of control circuitry (not shown). It is understood that valves 340 and 344 may be any other suitable valves capable of opening and closing and that valves 340 and 344 need not be limited to solenoid valves.

In a normal mode of operation (e.g., power is supplied by a primary power source), flow control valve 332, valve 340, and valve 344 may be CLOSED. When there is an interruption in a primary power source (e.g., utility 201 of FIG. 2) flow control valve 332 may be at least partially opened to cause liquid to be injected into working fluid path 325. The quantity of liquid injected in working fluid path 325 may depend on a number of different factors, including, for example, turbine power requirements, moisture concentration of compressed gas in a gas source (e.g., gas source 310), humidity requirements of a mission critical environment, or any other suitable factor. Flow control valve 332 may be adjusted as needed, based on one or more factors, to inject a desired quantity of liquid into working fluid path 325.

Different modes of operation for determining the quantity of liquid to inject into a working fluid path may be practiced. In one embodiment, flow control valve 332 may be adjusted in proportion to the electrical load on the system. In this approach, the quantity of liquid injected into a working fluid path (e.g., working fluid path 325) may be proportional to the mass flow of working fluid provided to a turbine (e.g., turbine 240 of FIG. 2) because the mass flow of working fluid provided to the turbine may depend on the electrical load on an electric machine. This embodiment may be suitable for replacing moisture removed from a compressed gas prior to being stored in a gas source.

In another embodiment, flow control valve 332 may be adjusted based on a monitored humidity level of a working fluid. In this approach, a humidity sensor (e.g., sensor 262 of FIG. 2, a dew point sensor, or any other suitable sensor) may be positioned as some point in the working fluid path or at a fluid destination (e.g., enclosure 290 of FIG. 2) to provide a feedback signal indicating the humidity level of the working fluid or environment. The feedback signal may be used to control flow control valve 332 to inject the requisite quantity of liquid to obtain a desired humidity level.

Liquid reservoir 350 may be any suitable vessel capable of containing a liquid under pressure. Certain size liquid reservoirs 350 may require refilling. During a refill, flow control valve 332 may be CLOSED and valve 340 may be OPENED to expose reservoir 350 to an ambient environment which may, for example, enable reservoir to reduce its internal pressure to an atmospheric pressure. Valve 340 may be OPENED to allow liquid to flow into reservoir 350 from a liquid source 360 (e.g., facility water supply) via OPEN valve 344. Reservoir 350 may be equipped with a liquid level detector 355 that may signal when reservoir is adequately filled. When filled, liquid level detector 355 may provide a signal to control circuitry (not shown) which may cause one or both of valves 340 and 344 to CLOSE, thereby preparing reservoir 350 for pressurization (e.g., during a backup mode of operation).

Persons skilled in the art will appreciate that many suitable approaches may be taken for filling reservoir 350. For example, a manual operation may be practiced where a user may unscrew an air tight cap, pour liquid into the reservoir, and watch through a sight glass to determine when to shut off the flow of liquid off. When done filling the reservoir, the user may screw the cap back on. In other approaches, because the liquid storage capacity is a matter of design choice, the reservoir be sized to handle several discharge events (e.g., events requiring a backup energy system to operate in a backup mode of operation), and may even be sized large enough to handle all discharge events that may occur during the expected operational life of the backup energy and cooling system. If sized large enough, liquid level detector 355 and valves 340 and 344 may be omitted.

Drain 370 may be included to remove any sediment that collects at the bottom of reservoir 350 or to drain the liquid stored therein.

Figure 4:
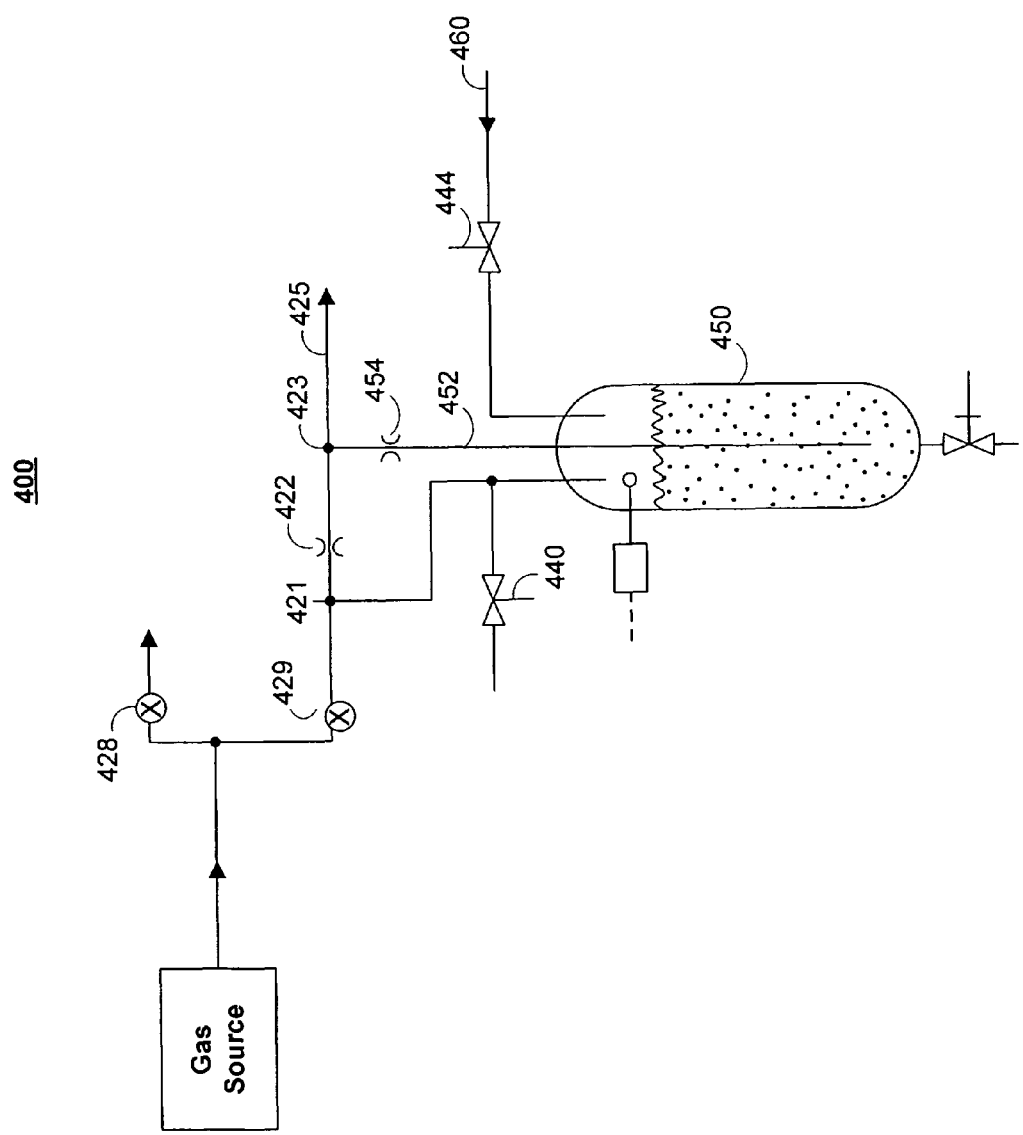
FIG. 4 is a schematic diagram of an alternative humidification system for introducing liquid into a pressurized working fluid path in accordance with the principles of the present invention.

FIG. 4 is a schematic diagram of an alternative humidification system 400 for introducing liquid into a pressurized working fluid path in accordance with the principles of the present invention. Humidification system 400 may be suited for introducing liquid at, for example, one or both of moisture entry points 202 and 204 (of FIG. 2). Humidification system 400 is similar in many respect to humidification system 300 of FIG. 3. For example, both systems may include many of the same components such as valves (e.g., valves 428, 429, 440, and 444), a liquid reservoir (e.g., reservoir 450).

Humidification system 400 may differ from humidification 300 in that in system 400, valve 330 and flow control valve 332 are omitted, and flow restriction regions 422 and 454 are added. Flow restriction region 422 may be placed within working fluid path 425 and flow restriction region 454 may be placed within conduit 452. Insertion of flow restriction region 422 in working fluid path 425 may cause the pressure of the working fluid upstream of flow restriction region 422 (e.g., region 421) to drop to a lower pressure downstream of restriction region 422 (e.g., region 423). This high to low pressure drop results in a pressure differential between the inlet (e.g., region 421) and the outlet (e.g., region 423) of liquid reservoir 450, which pressure drop may result in liquid being forced through conduit 452 to working fluid path 425.

The quantity of liquid injected into working fluid path 425 may depend on the pressure at region 421 (which pressure may be set by valve 429) and the size of restriction regions 422 and 454. Restriction regions 422 and 454 may be any device or structure that may limit flow of a working fluid such as inherent pressure loss in piping, a fixed diameter orifice, or a capillary tube.

An advantage of system 400 is that it injects liquid into a working fluid path without requiring certain regulators or flow control valves, thereby eliminating costs. Moreover, in conditions where the inlet pressure at region 421 is generally constant, restriction regions 422 and 454 may be sized appropriately to inject a desired quantity of liquid into working fluid path 425.

Figure 5:
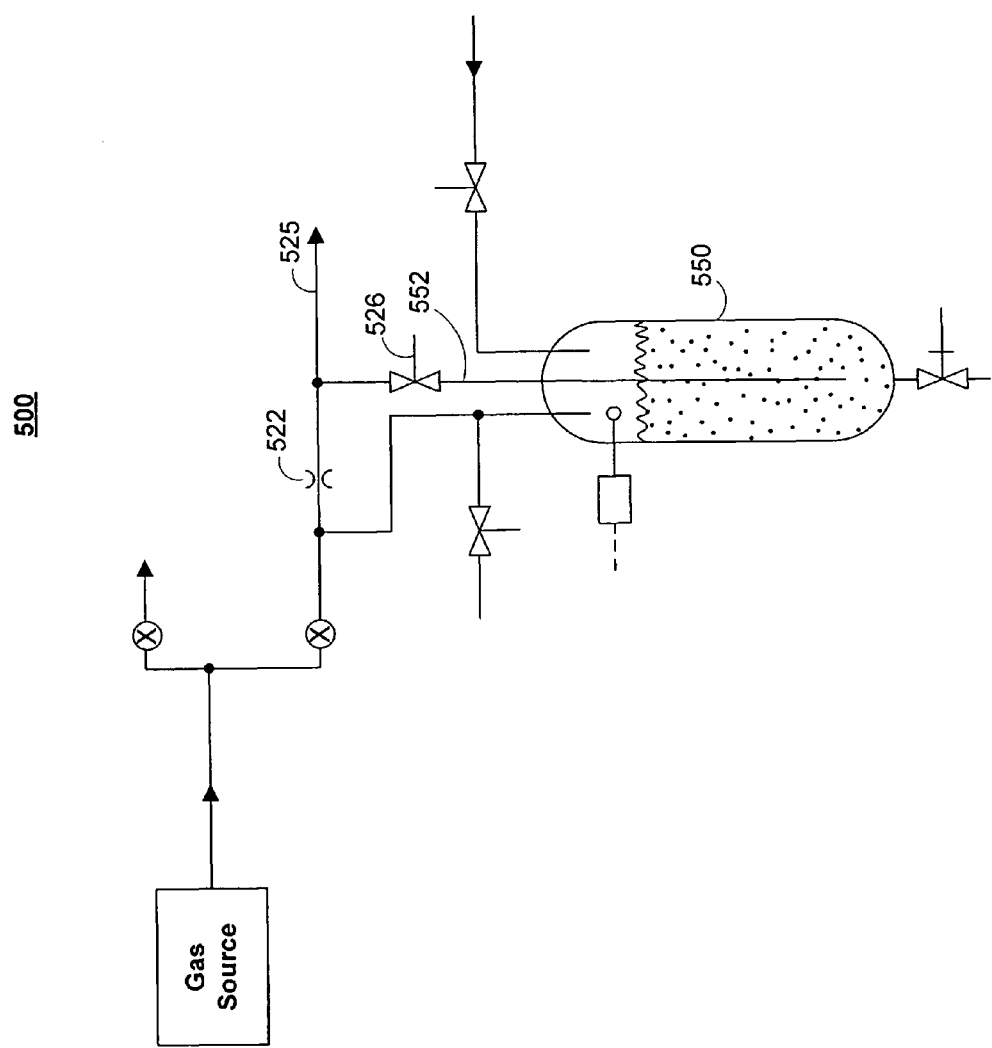
FIG. 5 is a schematic diagram of another alternative humidification system for introducing liquid into a pressurized working fluid path in accordance with the principles of the present invention.

FIG. 5 is a schematic diagram of another alternative humidification system 600 for introducing liquid into a pressurized working fluid path in accordance with the principles of the present invention. Humidification system 500 may be suited for introducing liquid at, for example, one or both of moisture entry points 202 and 204 (of FIG. 2). Humidification system 500 is similar in many respects to humidification system 400 of FIG. 4, except restriction region 454 of FIG. 4 is replaced with a flow control valve 526. Flow control valve 526 may be controlled by control circuitry (not shown) to adjust (e.g., STOP, increase, or decrease) the flow of liquid into working fluid path 525. For example, if it is determined that the moisture content of the working fluid is too low as may be determined by a sensor such as sensor 262 of FIG. 2, signals may be fed back to control circuitry, which may instruct valve 526 to increase the quantity of liquid being injected into working fluid path 525, or vice versa.

Figure 6:
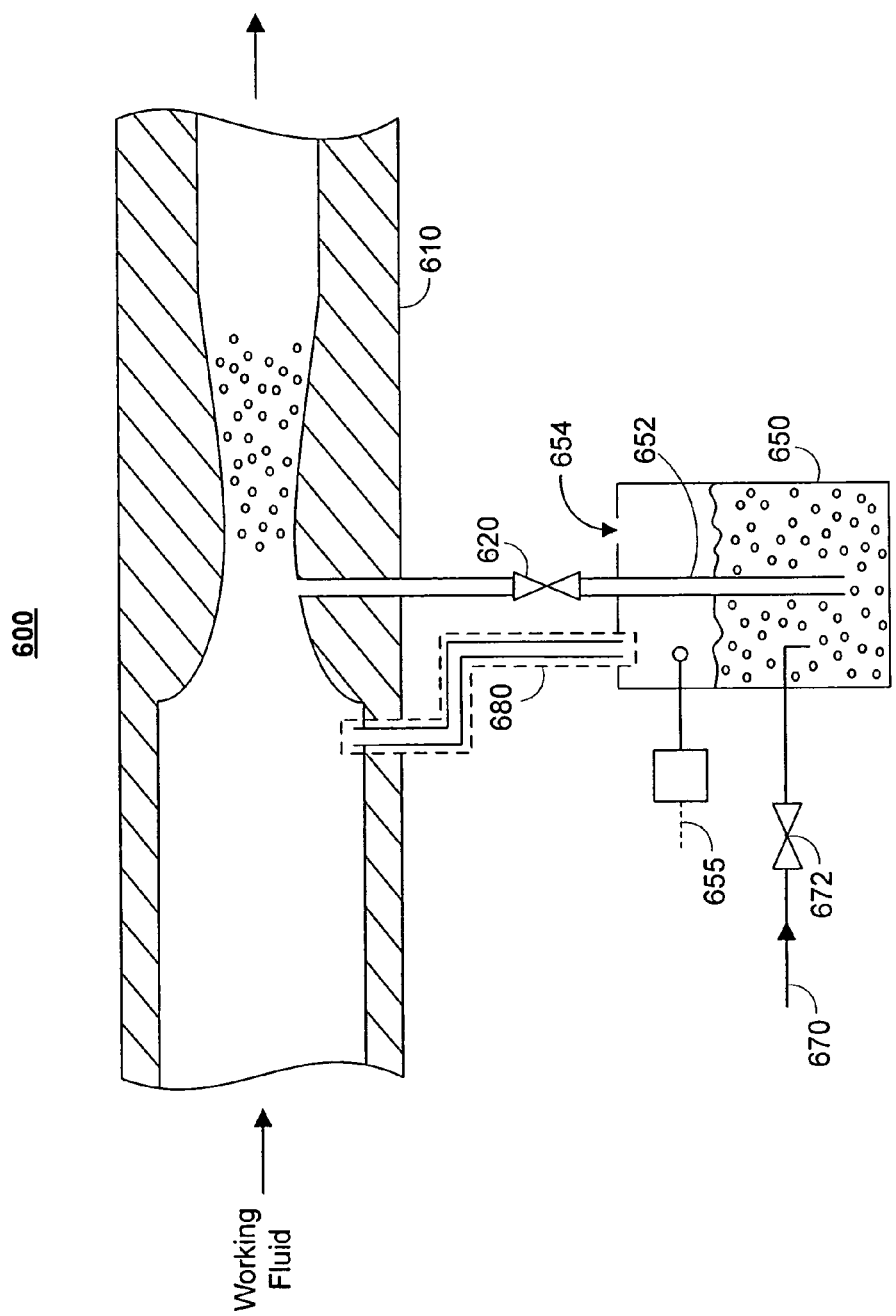
FIG. 6 is a schematic diagram of a humidification system for introducing liquid into a low pressure working fluid path in accordance with the principles of the present invention.

FIG. 6 is a schematic diagram of a humidification system 600 for introducing liquid into a low pressure working fluid path in accordance with the principles of the present invention. Humidification system 600 may be suited for introducing liquid at, for example, one or both of moisture entry points 206 and 208 (of FIG. 2). An advantage of system 600 is that it operates with working fluid having a pressure at low or atmospheric pressure and therefore does not require use of pressurized reservoirs for containing liquid or the pressure control arrangements such as those shown in FIGS. 3-5.

System 600 may include a liquid reservoir 650 and a conduit 652 that is fluidically coupled to a low pressure working fluid path 610. Reservoir 650 may be exposed to the ambient environment via vent 654 such that the interior reservoir pressure is at or near atmospheric pressure. Reservoir 650 may be exposed to the ambient environment so that the interior reservoir pressure is substantially equal to the pressure of the working fluid entering low pressure fluid path 610. In one approach, the working fluid entering low pressure working fluid path 610 may be the exhaust gas of a turbine (e.g., turbine 240 of FIG. 2) and this exhaust gas may be allowed to expand to or near atmospheric pressure.

The portion of the path 610 coupled to conduit 652 may include a venturi, as shown, or any other device that results in a pressure below ambient within the working fluid. The venturi may reduce the pressure of the working fluid at a region (e.g., at the moisture entry point) in working fluid path 610 such that a high to low pressure drop exists between reservoir 650 and path 610. This pressure drop may enable humidification system 600 to introduce liquid from reservoir 650 to low pressure working fluid path 610.

The flow of liquid into working fluid path 660 may be controlled using, for example, a flow control valve 620. Flow control valve 620 may increase or decrease the quantity of liquid injected into working fluid path 660 as need to achieve a desired humidity level, for example, in an enclosure. If desired, flow control valve 620 may CLOSE to prevent liquid from entering working fluid path 610. Flow control valve 620 may receive signals from control circuitry (not shown) which may provide those signals based on feedback signals one or more sensors (not shown) such as sensor 262 of FIG. 2. If desired, flow control valve 620 may be replaced with any suitable device that can restrict flow of liquid. For example, a structure having an orifice or a capillary tube may be placed into conduit 652.

Several design factors may be taken into account to ensure a high to low pressure drop exists between reservoir 650 and low pressure working fluid path 610. Design factors may include venturi design (e.g., which may influence the extent to which the working fluid pressure drops in working fluid path 610) and a maximum allowable difference between working fluid pressure entering working fluid path 610 and the reservoir pressure. It may be desirable to ensure that the pressure of the working fluid entering low pressure working fluid path and the interior pressure of reservoir 350 are approximately the same so that when the venturi reduces the pressure of the working fluid in path 610, liquid can be introduced into working fluid path 610. In one approach, where it is known that the working fluid pressure is equal to or nearly equal to atmospheric pressure, the interior of reservoir 650 may be exposed to an ambient environment via vent 654 so that the internal reservoir pressure of reservoir 650 is equal to or nearly equal to atmospheric pressure. In another approach (shown as optional conduit 680), reservoir may be an air tight vessel having a conduit (in addition to conduit 652) fluidically coupling the interior of the reservoir to the inlet portion of the low pressure working fluid path. This conduit may equilibrate the working fluid pressure (entering the working fluid path) and the interior reservoir pressure. Since the pressures are substantially equal, the venturi can reduce the working fluid pressure, thereby providing the high to low pressure drop to enable liquid to be introduced into working fluid path 610.

If there is a difference between the working fluid pressure entering working fluid path 610 and the reservoir pressure, then the venturi may be designed to produce a sufficient enough drop in working fluid pressure to ensure a high to low pressure drop between the reservoir and the working fluid path. However, if the pressure differential exceeds a maximum allowable pressure differential, the venturi may not be able to produce a sufficient enough drop in the working fluid pressure. In such a case, the reservoir may require pressurization.

Reservoir 650 may be refilled with liquid at anytime provided the pressure of liquid source 670 is higher than ambient pressure. Liquid sensor 655 may be used to determine if there is a shortage of liquid in reservoir 650. Upon determination of such a shortage, valve 672 may be OPENED to permit flow of liquid into reservoir 650.

Figure 7:
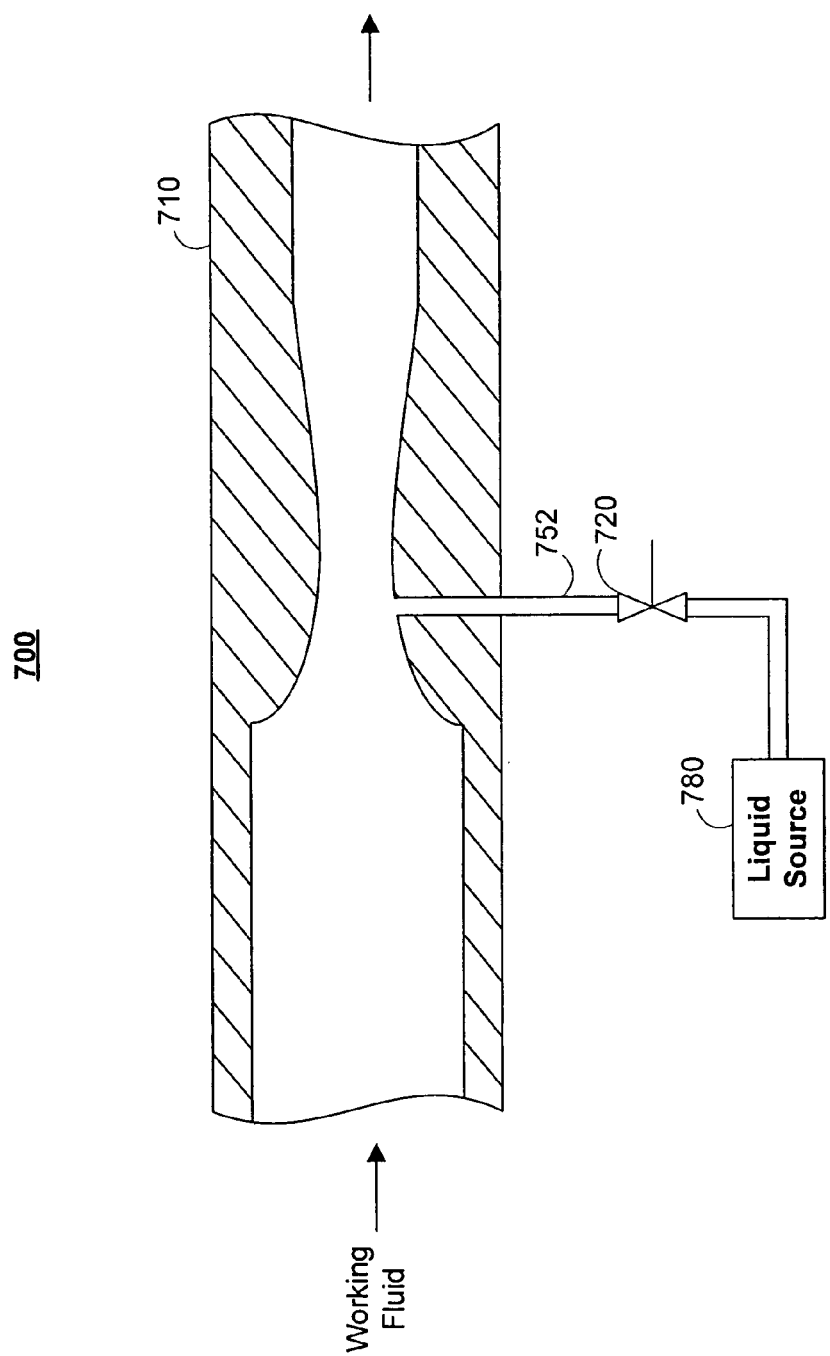
FIG. 7 is a schematic diagram of an alternative humidification system for introducing liquid into a low pressure working fluid path in accordance with the principles of the present invention.

FIG. 7 is a schematic diagram of an alternative humidification system 700 for introducing liquid into a low pressure working fluid path in accordance with the principles of the present invention. System 700 is similar to system 600 of FIG. 6, except that conduit 752 is connected to a liquid source 780, eliminating reservoir 650. Liquid source 780 may be, for example, water available from a faucet. Liquid stored in liquid source 780 may be sufficiently pressurized to ensure a high to low pressure drop between liquid source 780 and low pressure working fluid path 710. A valve 720 located between liquid source 780 and low pressure working fluid path 720 may be controlled (e.g., fully OPENED, fully CLOSED, or OPENED to a position between fully OPENED and fully CLOSED) to adjust the quantity of liquid introduced into low pressure working fluid path 710.

The humidification system according to the invention may be integrated into a backup energy and cooling CAS or TACAS system such that when such systems may provide backup cooling to a mission critical application or enclosure in the event of a disturbance in a primary power source.

Figure 8:
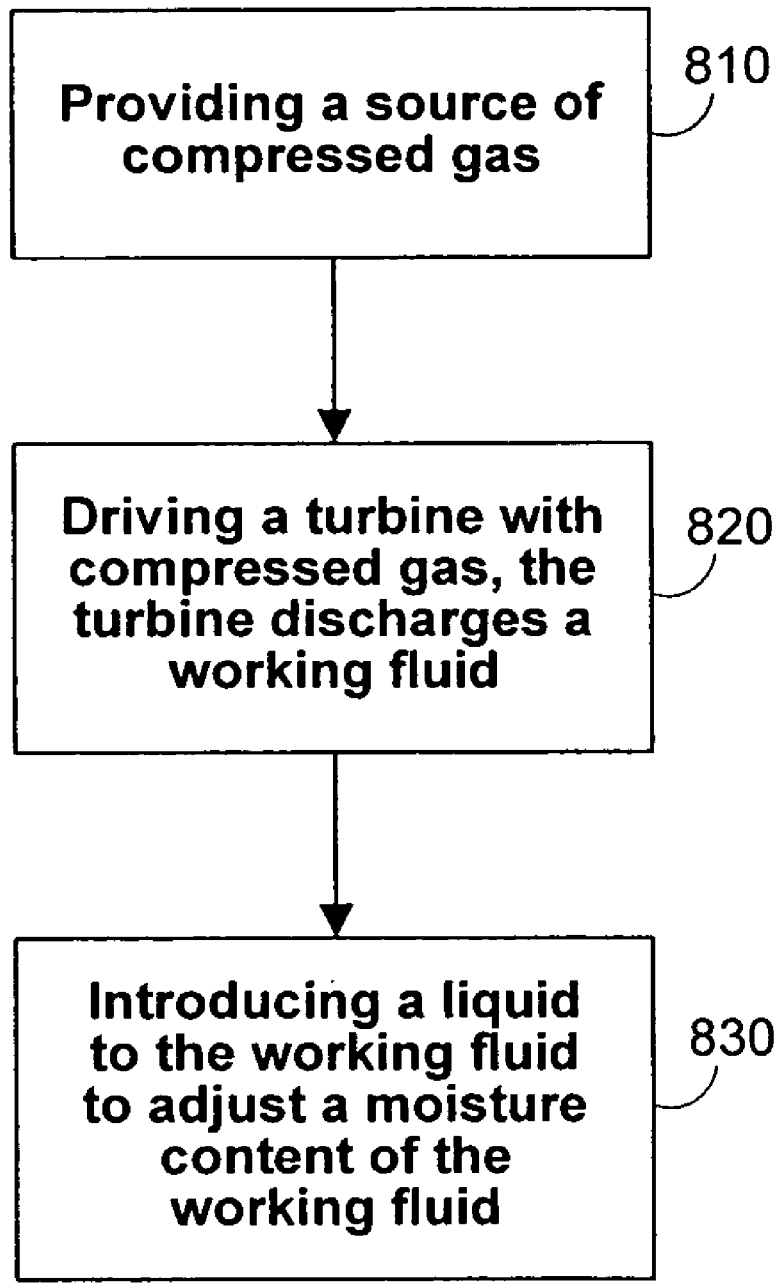
FIG. 8 is a flowchart showing steps for introducing a liquid into a low pressure working fluid path in accordance with the principles of the present invention.

FIG. 8 is a flowchart showing steps for introducing a liquid into a low pressure working fluid path in accordance with the principles of the present invention. At step 810, a source of compressed gas is provided. The compressed gas may be stored (e.g., at 4500 PSI) in a reservoir or one or more pressure tanks. The compressed gas may be used to drive a turbine, as indicated at step 820. The compressed gas may be routed through one or more high pressure working fluid paths to the turbine. As the compressed gas drives the turbine blades of the turbine, it may expand near or to atmospheric pressure as it is discharged away from the turbine. This exhausted gas may be referred to as a working fluid, which may be routed through a low pressure working fluid path.

At step 830, a liquid is introduced to the working fluid to adjust a moisture content of the working fluid. This liquid is introduced into the low pressure working fluid path in which the pressure of the working fluid is at a relatively low pressure (e.g., atmospheric pressure). This working fluid (having its moisture content adjusted) may be routed to an enclosure to influence the climate, particularly the humidity, of the enclosure.

Figure 9:
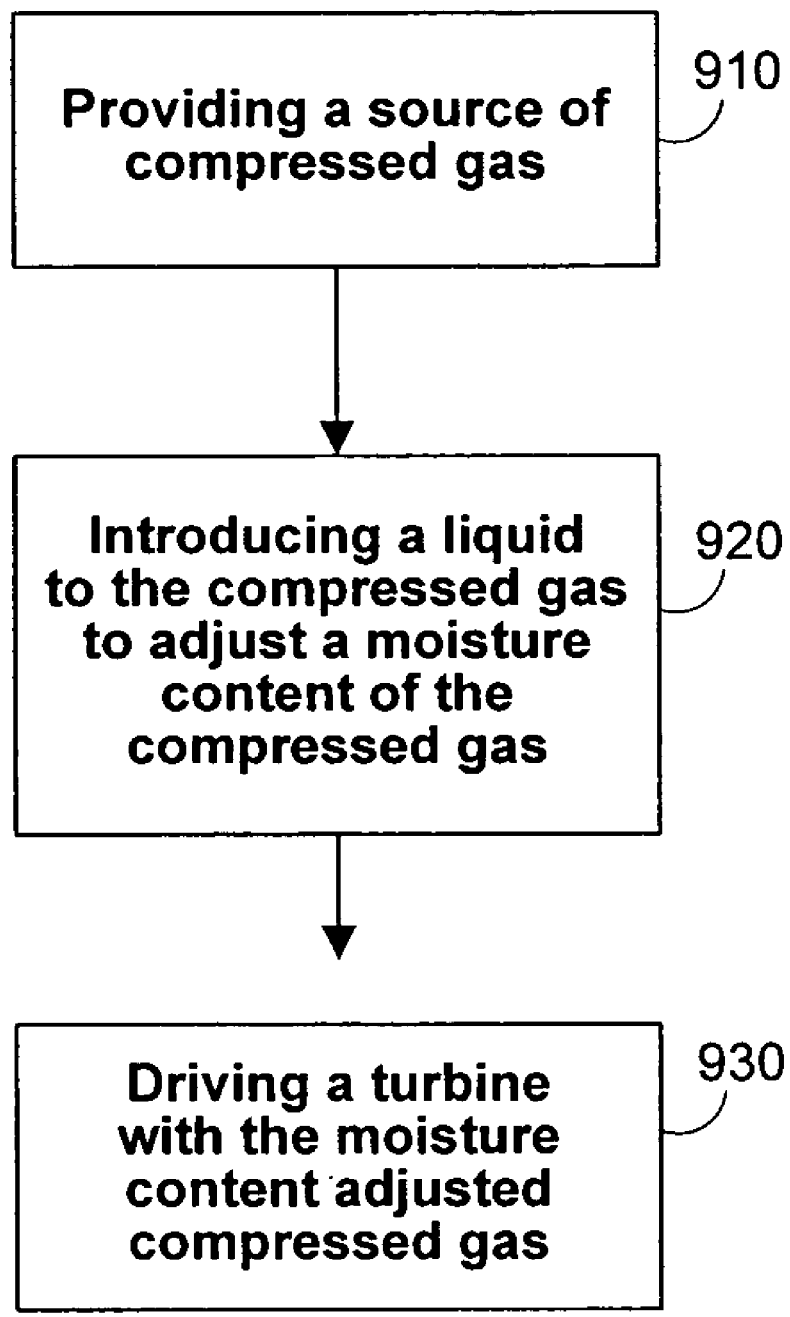
FIG. 9 is a flowchart showing steps for introducing a liquid into a high pressure working fluid path in accordance with the principles of the present invention.

FIG. 9 is a flowchart showing steps for introducing a liquid into a high pressure working fluid path in accordance with the principles of the present invention. At step 910, a source of compressed gas is provided. This compressed gas may be routed to a turbine in one or more working fluid paths. At step 920, prior to the turbine, liquid is introduced into the high pressure working fluid path to adjust a moisture content of the compressed gas. At step 930, the moisture content adjusted compressed gas drives a turbine. That compressed gas (having an adjusted moisture content) is exhausted by the turbine as a working fluid which may be routed to an enclosure to influence the climate, particularly the humidity, of the enclosure.

Thus it is seen that systems and methods for controlling humidity are provided. A person skilled in the art will appreciate that the present invention can be practiced by other than the described embodiments, which are presented for purposes of illustration rather than of limitation, and the present invention is limited only by the claims which follow.

What is claimed is:

1. A system comprising:
a source of compressed gas;
a turbine coupled to receive the compressed gas, the turbine driven by the compressed gas and provides a working fluid to a working fluid path; and
a liquid injection system coupled to the working fluid path operative to introduce a liquid to the working fluid path to adjust a moisture content of the working fluid, the liquid introduced to the working fluid path via a flow control valve,
further comprising:
a sensor coupled to the working fluid path and operative to monitor the moisture content of the working fluid, wherein the liquid injection system adjusts a quantity of liquid introduced to the working fluid path based on the monitored moisture content.

2. A system comprising:
a source of compressed gas;
a working fluid path coupled to receive compressed gas from the source of compressed gas;
a liquid injection system coupled to the working fluid path operative to introduce a liquid to the working fluid path via a flow control valve to adjust a moisture content of the compressed gas; and
a turbine coupled to the working fluid path and is driven by the adjusted moisture content compressed gas, the turbine provides a working fluid having a predetermined moisture content,
wherein the liquid injection system comprises:
a reservoir that contains the liquid;
a first valve coupled to the reservoir operative to reduce the pressure within the reservoir when OPEN; and
a second valve coupled to the reservoir operative to allow liquid to flow into the reservoir when OPEN.

3. A system comprising:
a source of compressed gas;
a working fluid path coupled to receive compressed gas from the source of compressed gas;
a liquid injection system coupled to the working fluid path operative to introduce a liquid to the working fluid path via a flow control valve to adjust a moisture content of the compressed gas; and
a turbine coupled to the working fluid path and is driven by the adjusted moisture content compressed gas, the turbine provides a working fluid having a predetermined moisture content,
wherein the liquid injection system comprises:
a reservoir that contains the liquid;
a conduit that fluidically couples the reservoir to the working fluid path;
a pressure regulating valve fluidically coupled to the source of gas and the reservoir, the valve operative to set the pressure within the reservoir higher than the pressure of the compressed gas in the working fluid path; and
a flow control valve fluidically coupled to the reservoir operative to control the flow of compressed gas into the reservoir, which in turn controls a quantity of the liquid introduced into the working fluid path.

4. A system comprising:
a source of compressed gas;
a working fluid path coupled to receive compressed gas from the source of compressed gas;
a liquid injection system coupled to the working fluid path operative to introduce a liquid to the working fluid path via a flow control valve to adjust a moisture content of the compressed gas; and
a turbine coupled to the working fluid path and is driven by the adjusted moisture content compressed gas, the turbine provides a working fluid having a predetermined moisture content,
wherein the working fluid path includes a first restriction region,
the liquid injection system comprising:
a reservoir that contains the liquid;
a first conduit that fluidically couples a portion of the working fluid path upstream of the first restriction region to the reservoir; and
a second conduit that fluidically couples the reservoir to the working fluid path, the conduit including a second restriction region, wherein the first and second restriction regions are sized such that a predetermined quantity of the liquid is introduced into the working fluid path.

5. A system comprising:
a source of compressed gas;
a working fluid path coupled to receive compressed gas from the source of compressed gas;
a liquid injection system coupled to the working fluid path operative to introduce a liquid to the working fluid path via a flow control valve to adjust a moisture content of the compressed gas; and a turbine coupled to the working fluid path and is driven by the adjusted moisture content compressed gas, the turbine provides a working fluid having a predetermined moisture content, wherein the working fluid path includes a first restriction region, the liquid injection system comprising:

a reservoir that contains the liquid;

a first conduit that fluidically couples a portion of the working fluid path upstream of the first restriction region to the reservoir; and a second conduit that fluidically couples the reservoir to the working fluid path, the conduit including a flow control valve operative to control a quantity of the liquid introduced into the working fluid path.

6. A system comprising:

a source of compressed gas;

a working fluid path coupled to receive compressed gas from the source of compressed gas;

a liquid injection system coupled to the working fluid path operative to introduce a liquid to the working fluid path via a flow control valve to adjust a moisture content of the compressed gas; and a turbine coupled to the working fluid path and is driven by the adjusted moisture content compressed gas, the turbine provides a working fluid having a predetermined moisture content, further comprising:

a sensor operative to monitor the moisture content of the working fluid, wherein the liquid injection system adjusts a quantity of liquid introduced to the working fluid path based on the monitored moisture content.

7. A backup energy and cooling system including a working fluid path, comprising:

a source of compressed gas;

a turbine coupled to receive the compressed gas, the received compressed gas drives the turbine;

an electrical machine powered by the turbine when the turbine is driven by the compressed gas, the generator providing backup power to a load when powered by the turbine;

a working fluid path constructed to route the compressed gas from the source of compressed gas to at least the turbine and to route a turbine exhaust gas from the turbine to a predetermined as destination; and a humidification system coupled the working fluid path and operative to introduce a liquid to the working fluid path, further comprising a sensor to detect the moisture content of a gas in the working fluid path.

\* \* \* \* \*